(12) United States Patent
Gräf et al.

(10) Patent No.: US 7,082,909 B2
(45) Date of Patent: Aug. 1, 2006

(54) FREE-PISTON DEVICE WITH ELECTRIC LINEAR DRIVE

(75) Inventors: Markus Gräf, Ostfildern (DE); Martin Nedele, Reutlingen (DE); Jürgen Gräf, Augsburg (DE)

(73) Assignee: Deutsches Zentrum fur Luft- und Raumfahrt e.V., Bonn (DE)

( * ) Notice: Subject to any disclaimer, the term of this patent is extended or adjusted under 35 U.S.C. 154(b) by 0 days.

(21) Appl. No.: 10/972,110

(22) Filed: Oct. 22, 2004

(65) Prior Publication Data

US 2005/0081804 A1    Apr. 21, 2005

Related U.S. Application Data

(63) Continuation of application No. PCT/EP03/04199, filed on Apr. 23, 2003.

(30) Foreign Application Priority Data

Apr. 25, 2002    (DE) ................ 102 19 549

(51) Int. Cl.
*F02B 71/00* (2006.01)
(52) U.S. Cl. .................................. 123/46 E
(58) Field of Classification Search ............ 123/46 R, 123/46 A, 46 B, 46 SC, 48 E
See application file for complete search history.

(56) References Cited

U.S. PATENT DOCUMENTS

| 4,154,200 A | 5/1979 | Jarret et al. |
|---|---|---|
| 4,385,597 A | 5/1983 | Stelzer |
| 4,454,426 A | 6/1984 | Benson |
| 4,924,956 A | 5/1990 | Deng et al. |
| 5,287,827 A * | 2/1994 | Almendinger et al. .... 123/46 R |
| 6,199,519 B1 | 3/2001 | Van Blarigan |
| 6,651,599 B1 * | 11/2003 | Wechner .................. 123/46 R |
| 2003/0024492 A1 | 2/2003 | Malmquist et al. |

FOREIGN PATENT DOCUMENTS

| DE | 113 593 | 6/1975 |
|---|---|---|
| DE | 31 03 432 A1 | 9/1982 |
| DE | 40 24 591 A1 | 2/1992 |
| DE | 43 44 915 A1 | 7/1995 |
| DE | 198 13 992 A1 | 10/1999 |
| GB | 854255 | 11/1960 |
| GB | 1392827 | 4/1975 |
| GB | 2 334 385 A | 8/1999 |
| WO | WO 01/45977 A2 | 6/2001 |

OTHER PUBLICATIONS

Van Blarigan, Peter, "Advanced Internal Combustion Engine Research", *Proceedings of the 2000 DOE Hydrogen Program Review*, 2000, pp. 1-19.

* cited by examiner

*Primary Examiner*—Henry C. Yuen
*Assistant Examiner*—Hyder Ali
(74) *Attorney, Agent, or Firm*—Alston & Bird LLP

(57) ABSTRACT

To provide a universally usable free-piston device with electric linear drive, comprising at least one piston receptacle with at least one piston device arranged for linear displacement in the piston receptacle, the piston device comprising a traveller device, and a stator device being arranged on the piston receptacle, and the at least one piston device being drivable under the action of a medium which expands in an expansion space, it is proposed that the piston stroke be variably adjustable via the linear drive such that the dead centers of the displacement of the piston device are definable.

63 Claims, 6 Drawing Sheets

FREE-PISTON DEVICE WITH ELECTRIC LINEAR DRIVE

CROSS-REFERENCE TO RELATED APPLICATIONS

The present application is a continuation application of International Application PCT/EP03/04199, filed Apr. 23, 2003, and also claims the benefit of German Application No. 102 19 549.8, filed Apr. 25, 2002, which are incorporated herein by reference in their entirety and for all purposes.

FIELD OF THE INVENTION

The invention relates to a free-piston device with electric linear drive, comprising at least one piston receptacle with at least one piston device arranged for linear displacement in the piston receptacle, the piston device comprising a traveler device, and a stator device being arranged on the piston receptacle, and the at least one piston device being drivable under the action of a medium which expands in an expansion space.

BACKGROUND OF THE INVENTION

Free-piston devices are known, for example, from DE 22 17 194 C3, which corresponds to U.S. Pat. No. 4,154,200. With such devices, chemical energy can be partly converted by means of combustion into mechanical energy, namely kinetic energy of a piston device, and, in turn, this mechanical energy can then be converted via the linear drive at least partly into electric energy. Owing to configuration of the piston displacement as free-piston displacement, a pure linear displaceability of the pistons can be realized without a crankshaft having to be provided.

Corresponding devices can be used, for example, as part of hybrid drives for motor vehicles and, in particular, in conjunction with serial hybrid concepts. They can also be used as compact current-generating units for generating current or in conjunction with stationary applications such as, for example, block-type thermal power stations.

Combustion devices with electric generators are also known from U.S. Pat. No. 6,199,519 B1, DE 31 03 432 A1, East German Patent No. 113 593, DE 43 44 915 A1 or from the article "ADVANCED INTERNAL COMBUSTION ENGINE RESEARCH" by P. Van Blarigan, Proceedings of the 2000 DOE-Hydrogen Program Review.

SUMMARY OF THE INVENTION

In accordance with the invention, a universally usable free-piston device with electric linear drive is provided. In accordance with the invention, the piston stroke is variably adjustable via the linear drive such that the dead centers of the displacement of the piston device are definable. Owing to the piston stroke being variably adjustable by the linear drive being acted upon electrically in a corresponding manner, the movement of the at least one piston device is adjustable such that the optimum conditions for the respective application prevail.

A variable compression is achievable by a variable piston stroke, as the reversal points of the movement of a compressor piston of the piston device can be specifically adjusted. The device can thus be optimally operated in every load range. At full load, for example, a large amount of gas must be taken in. Therefore, for example, for combustion gases a large combustion space (i.e., expansion space) is required and hence also a large piston stroke. In partial-load operation, on the other hand, the intake volume is reduced, and the volume has, therefore, to be reduced. The linear drive can then also assist the start-up of the device by, for example, the initial compression being controlled via the linear drive.

The desired form of displacement of the piston device can be adjusted in a specific manner via control of the linear drive. The desired reversal point, the piston speed and the compression can each be adjusted so that, in particular, in partial-load operation improved partial-load efficiency is achievable as no throttle valve is required. Thus, the operating point of the device can be precisely fixed by a specific pre-setting of flows in the stator device. In this way, an expansion chamber such as, for example, a combustion chamber can then be optimally adapted to the application, i.e., in particular, the volume and the surface of the expansion chamber can be specifically adapted. In turn, considerable controlling possibilities result from this.

It is, for example, possible to operate the device with different fuels or with expandable, non-combustible heat transfer media such as steam, i.e., the device is capable of operating with many materials. Nor is any conversion of the device as such required therefor, i.e., the adaptation to a certain fuel such as vegetable oil or diesel (Diesel principle) or regular unleaded or premium leaded gasoline (Otto principle) or hydrogen or natural gas can be carried out "online" by the piston stroke being adjusted accordingly by, for example, the respective stator device being acted upon with current. It is even possible to realize a combined Otto-Diesel engine with the inventive device. It is, for example, also possible to change between two-cycle operation and four-cycle operation.

A piston receptacle can have a constant inside diameter or a varying diameter and can be, for example, of stepped construction. Several piston receptacles can be provided, and piston receptacles can be arranged in packets or in the shape of a V.

It is possible to generate the expanding medium in the expansion space or to couple it into the expansion space in different ways. For example, the expansion space can be a combustion space in which fuel combustion takes place and expanding combustion gases are thereby generated. It is also possible for the expansion space to be a combustion space into which combustion gases are coupled, and these expand in the combustion space. Furthermore, it is possible to couple a heat transfer medium such as steam into the expansion space, with this heat transfer medium being generated externally or energy being supplied to it externally. This heat transfer medium then expands in the expansion space and brings about piston displacement.

In particular, it is advantageous for the dead centers to be spatially definable with respect to the piston receptacle so as to be able to determine the combustion of the system via a corresponding setting. It is then also advantageous for the dead centers for the displacement of the piston device to be definable with respect to time. In turn, a displacement of the at least one piston device, which has a constant period, can thereby also be adjusted. This makes it possible, for example, to use compression wave chargers for a combustion space as expansion space.

It is particularly advantageous for the displacement of the piston device to be variably adjustable such that the location of the piston device is definable at any point in time. As a special case, the piston speed is, in particular, adjustable. In this way, with corresponding pre-setting of the forms of displacement of the at least one piston device via the linear drive, optimum adaptation to the respective operating parameters of the device is achievable, these operating parameters being determined, in particular, by the fuel used, by the load state, and further parameters. Furthermore, it is expedient for top dead center and bottom dead center of the piston stroke of the piston device to be definable so as to be able to bring about an optimum adaptation.

To enable setting of a variable piston stroke, the piston device delimits an expansion space at a first end, and a space which is not an expansion space at an opposite end. Variable adjustment of the device is thus possible via the controlling of the piston stroke. In particular, the compression in the expansion space is adjustable via the linear drive so as to achieve optimization of the system. It is thus possible to variably adjust an operating point of the system accordingly. In particular, the expansion space is then adjustable, above all, with respect to volume and surface, so as to be able to bring about the corresponding adaptation.

A control device is advantageously provided, via which the linear drive is electrically activatable so that a variable piston stroke is settable. This setting is achieved, in particular, via a controlling of the flow of current in the stator device. In this sense, the linear drive then also acts as linear motor, via which the piston stroke and hence the reversal points or dead centers (T.D.C. and B.D.C.) of the piston displacement are adjustable. With a plurality of piston devices, each can have a control device of its own associated therewith, or such a control device can control several piston devices.

It is particularly advantageous for a piston device to comprise a first piston, and an opposite second piston fixedly connected thereto, with the first piston delimiting the associated expansion space. The first piston is the actual compressor piston on which the expanding medium such as, for example, expanding combustion gases, acts, in order to move the piston device. The first piston is supported by the second piston. Transverse forces are thereby minimized, i.e., a tilting of the piston device is prevented. In turn, a defined, highly precise linear movement is ensured. Furthermore, the expenditure involved in lubrication between piston and cylinder inside wall can be kept low as short piston skirts with a corresponding reduced friction surface can be realized in the pair of pistons owing to the compressor piston being supported by the other piston. There is then no necessity to provide an oil pump, but instead, for example, simple splash lubrication is sufficient. Furthermore, apart from metallic materials it is possible to use other materials such as ceramic materials or graphite for the pistons themselves, as a highly precise guidance with minimized friction losses is achievable with only substantially pure pressure loads occurring.

The inventive concept also makes it possible to dispense with use of a cylinder head gasket as the piston receptacle can be manufactured in one piece at least in the area of an expansion space.

Arranged between the first piston and the second piston is a traveler device which, for example, generates a magnetic field which, upon relative movement with respect to the stator device, leads to a voltage induction, whereby, in turn, a current can then be tapped at the device. The traveler device and the stator device form the linear drive which converts the kinetic energy of the piston device into electric energy or vice versa converts electric energy into kinetic energy.

It is also advantageous for the non-expansion space of a piston device to be designed as a resilience space. Via such a resilience space, mechanical energy which is not coupled out by the linear drive can be absorbed during the combustion cycle. The correspondingly stored energy can, for example, be used in two-cycle operation for compressing a fuel-air mixture or in four-cycle operation for discharging the exhaust gases. A compressible element and/or medium, which absorbs the mechanical energy accordingly and then releases it again, is accommodated in the resilience space. The compressible element can be a mechanical element and, in particular, a compression spring. It is, however, particularly advantageous for the compressible medium to be a compressible fluid such as, for example, air. If provision is then made for the pressure in the resilience space to be adjustable and/or controllable, the "elastic" properties of this medium are then adjustable.

Moreover, by controlling the pressure in the resilience space, a pumping effect, for example, with respect to the piston device is achievable in order to control the overflowing of air. Air which has been drawn in can then be pumped in a controlled manner into the combustion space.

Provision may also be made for the pressure in the resilience space to be controllable such that a pre-compression function is achievable. The power of the system is thereby increased, as a pre-compression can then take place. Via a controllable resilience space, a pumping function, compression function or suction function can be realized. These respective functions can be used to control combustion procedures. They can, however, also be used for external purposes such as, for example, assisting the braking power when the device is used in a motor vehicle.

To make such controlling possible, the resilience space is provided with at least one controllable inlet valve and at least one controllable outlet valve for the compressible medium. The valves are switched such that, with respect to the resilience effect, a compression is made possible.

Furthermore, it is expedient for a first piston device and a second piston device which are arranged for linear displacement to be provided, with the piston devices each comprising a traveler device, and a stator device associated with the respective traveler device being arranged on the piston receptacle. In particular, the piston devices are collinearly displaceable relative to each other in opposite directions. In this way, a balancing of masses during the movement of the piston devices can be carried out, so that the mechanical stability of the device can be optimized. It is then expedient for each of the two piston devices to have an expansion space of its own associated with it, so as to be able to drive both piston devices via expanding medium such as, for example, combustion gases.

Furthermore it is expedient for the combustion space to be formed between a piston in the respective piston device, which faces away from the other piston device, and a piston receptacle which faces the piston. A variable piston stroke can thus be set for both piston devices, as described hereinabove.

Provision may be made for a further expansion space and, in particular, combustion space, to be arranged between the two piston devices. In particular, this further expansion space is synchronously operable with the two outer expansion spaces (here synchronously means essentially in counter cycle). In this way, an increase in power is achievable.

It is particularly advantageous for the valve or valves for the gas exchange in an expansion space to be controllable and, in particular, electrically controllable via a control device. This enables individual setting of all control times of the gas exchange, which considerably influence, for example, combustion characteristics. This controlling, which, in particular, can be carried out via predetermined software settings, then makes it possible for an optimum operating point of the entire system to also be set for variable applications.

It is particularly advantageous for inlet valves and/or outlet valves for an expansion space to be arranged and constructed such that a flow of gas (inlet flow and/or outlet flow) can form substantially along an expansion chamber wall. In particular, in two-cycle operation, a reverse flushing can thus be realized, which makes the provision of inlet slots and outlet slots superfluous. In turn, the exhaust gas quality can thereby be improved and oil losses minimized. The inventive concept opens up a large number of possibilities for introducing fuel into the system. Powered injection systems can also be used and, in particular, direct injection systems for introducing fuel into the combustion space or spaces.

In an advantageous variant of an embodiment, a charger is provided for controlling the gas exchange in an expansion space or the expansion spaces. The gas exchange can then be controlled with low energy expenditure. In particular, the charger is a compression wave charger or a Comprex charger, which can be operated with low power. In this way, a pre-compression of the intake air can be achieved. As the inventive device can control the linear displacement of the at least one piston device such that a constant period of the oscillation of the piston displacement prevails at all possible operating points, a compression wave charger which is dependent upon constant periods with low period spread can be used. In particular, the charger is connected to one or several expansion spaces for the respective piston devices so as to be able to carry out a correspondingly synchronized gas exchange with respect to the expansion spaces.

In a constructionally simple embodiment, the piston devices are lubricated by means of splash lubrication.

Furthermore, it is advantageous for a heating device to be provided for preheating. In the case of a cold start, where friction losses occur, the exhaust gas quality is impaired and increased wear occurs, the problems mentioned can thereby be reduced. In particular, windings of the stator device are used as heating elements, so there is no necessity for increased constructional expenditure.

The traveler device advantageously comprises a plurality of magnet elements, with which one or several flux guiding elements is or are associated, and, in particular, between which a flux guiding element is respectively arranged. In this way, the magnetic flux lines of neighboring magnet elements can be concentrated, whereby, in turn, the power density of the system of the traveler device is optimizable, i.e., can assume high values. Inexpensive magnet elements with low retentivity can then be used in order to nevertheless achieve a high power density.

The traveler device can be constructed in a constructionally simple way when the magnet elements and the flux guiding elements are seated on a piston rod, with this piston rod then connecting the two pistons of the pair of pistons of a piston device.

Furthermore, it is expedient for the magnet elements and the flux guiding elements to be formed rotationally symmetrically with respect to an axis of the piston rod, so as to thereby generate a defined induction voltage. It is expedient for the magnet elements and the flux guiding elements to be arranged alternately, so as to be able to generate high induction voltages during the movement of the traveler device relative to the stator device.

The flux guiding elements are made of a magnetically conductive material such as iron or of a powder composite material which is magnetically conductive. By means of these, the magnetic flux lines of the neighboring magnet elements are concentratable, so that these act as "magnetic flux line collectors".

The magnet elements can be permanent magnet elements or electromagnet elements. When electromagnet elements are provided, the energy for operating these elements must be transmitted to the traveler device. This can be carried out, for example, inductively or by means of slip rings.

It is, in principle, also possible to equip the traveler device with short-circuit rings for an asynchronous operating mode, and this mode of operation then corresponds to that of an asynchronous machine. Furthermore, provision may also be made for the traveler device to be provided with a tooth structure with respect to a surface facing the stator device, or to have such a tooth structure, so that via corresponding different magnet resistances (reluctance) of the thus-formed magnetic circuit, a voltage is induced in the coils of the stator device by correctly phased switching or winding. In addition, permanent magnets may be used in order to reinforce the corresponding forces.

In an advantageous embodiment, the stator device and traveler device have different pole pitches, so that the power formation of the linear drive is not based on the fundamental waves of the stator current loading and the traveler field, but the harmonic waves of the current loading with the fundamental wave of the traveler field produce the main power effect. The cross sections of magnetic yokes can thus be dimensioned smaller. Moreover, the power density of the system can thereby be considerably increased as it can be operated with higher frequencies, for example, in the order of magnitude of 500 Hz or higher.

Provision may be made for additional secondary windings to be provided, with which electric energy can be coupled out. Via these secondary windings, which are adapted to a given energy requirement and a given voltage level, an electrical system of a motor vehicle can, for example, be supplied with current. The corresponding expenditure for coupling out a corresponding current is low, and it is advantageous for secondary windings to be followed by a rectifier in order to generate rectified current.

The linear drive can be of one-phase or multi-phase construction.

To generate an induction voltage, a stator device has windings, and, in particular, main ring windings, extending around the piston receptacle. Ring windings can be wound particularly easily. Owing to the relative movement between the stator device and the traveler device, a voltage is induced in the windings in the stator device. The electric energy is coupled out or coupled in completely or for the most part by the main ring windings.

A synchronizing device for synchronizing the movement of the two piston devices is expediently provided. Operation of the two piston devices in opposite directions is thereby settable with high precision so as to also achieve a balancing of masses with high precision.

In particular, the synchronizing device then has secondary windings on the piston receptacle, with the current flowing through these being individually controllable. If an asynchronism of the two piston devices is then detected, the piston that is running too quickly can be braked and/or the piston that is running too slowly can be accelerated by correspondingly controlling the flow of current. In the case of synchronous movement, these secondary windings can be used, for example, to branch off electric energy for an electrical system. The secondary windings can also be used for diagnosing purposes. Thus, for example, the introduction of fuel can be controlled so as to achieve a synchronous running with two or more piston devices.

Provision may also be made for the synchronizing device to have secondary windings on the piston receptacle, which are associated with the respective piston devices and are electrically connected to one another, so that a compensating current can flow between the secondary windings. The synchronization of the two piston devices is automatically regulated via this compensating current: if these move synchronously, no current flows. If these move asynchronously, then the generated compensating current causes the piston device that is moving too quickly to be braked and the piston device that is running too slowly to be accelerated.

In particular, the flow of current is electrically controllable, so that, for example, it is possible to set a threshold value which, when exceeded, indicates that a synchronizing procedure has to be carried out.

To assist the synchronization of the two piston devices, provision may be made for the position of a piston device in the cylinder to be detected by a control device from the voltage induced in the stator device. The respective position of the piston device is thereby detectable independently of a compensating current, so as, for example, to also monitor the movement of these piston devices.

It is also advantageous for a lubricator for a piston device to be constructed such that the associated traveler device is coolable with the lubricating oil. The constructional expenditure for the cooling of the traveler device is thereby minimized.

Furthermore, it is advantageous for cooling ducts to be arranged around the stator device and/or the piston receptacle, in particular, in the area of an expansion space. The active components of the device can then be cooled via a corresponding cooling device which comprises these cooling ducts. However, it is then also possible to couple out via the cooling device usable heat which can then be supplied to thermal applications such as, for example, the vehicle heating system or a block-type thermal power station. In turn, the overall efficiency of the system is thereby increased.

Provision may be made for an expansion space to be constructed as combustion space. Combustion gases then expand in such a combustion space. The combustion gases themselves can, in turn, be generated in the combustion space by combustion procedures taking place therein, or they can be produced externally and then coupled into the combustion space.

It is also possible for a heat transfer medium such as steam to expand in the expansion space. This heat transfer medium is preferably generated outside the expansion space or energy is supplied to the heat transfer medium outside the expansion space. For example, hot steam is coupled into an expansion space. The steam can expand therein and bring about a linear displacement of the piston device. In turn, current can be obtained therefrom. The heat generation and pressure increase take place outside the expansion space. Various methods can be used for generating the heat transfer medium or for heating the heat transfer medium. For example, heating can be carried out via concentrated solar radiation, with the solar radiation being concentrated via solar collectors. Heating or heat transfer can also take place via the combustion of solid, liquid or gaseous fuels. The heated heat transfer medium can then be temporarily stored in a pressure vessel. In accordance with the invention, a free-piston steam engine can thus be constructed, which in comparison with classic steam engines, has a higher electric efficiency. When, for example, steam is used as medium expanding in the expansion space, lubricating problems with the moving piston device are diminished as, in particular, water lubrication of the piston device can be employed.

It is expedient for a recooling device to be provided for medium discharged from the expansion space. Thus, a circuit for the heat transfer medium can be created for supplying it to the free-piston device and discharging it from the free-piston device.

BRIEF DESCRIPTION OF THE DRAWINGS

Preferred exemplary embodiments of the invention are explained in more detail hereinbelow with reference to schematic drawings, in which.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
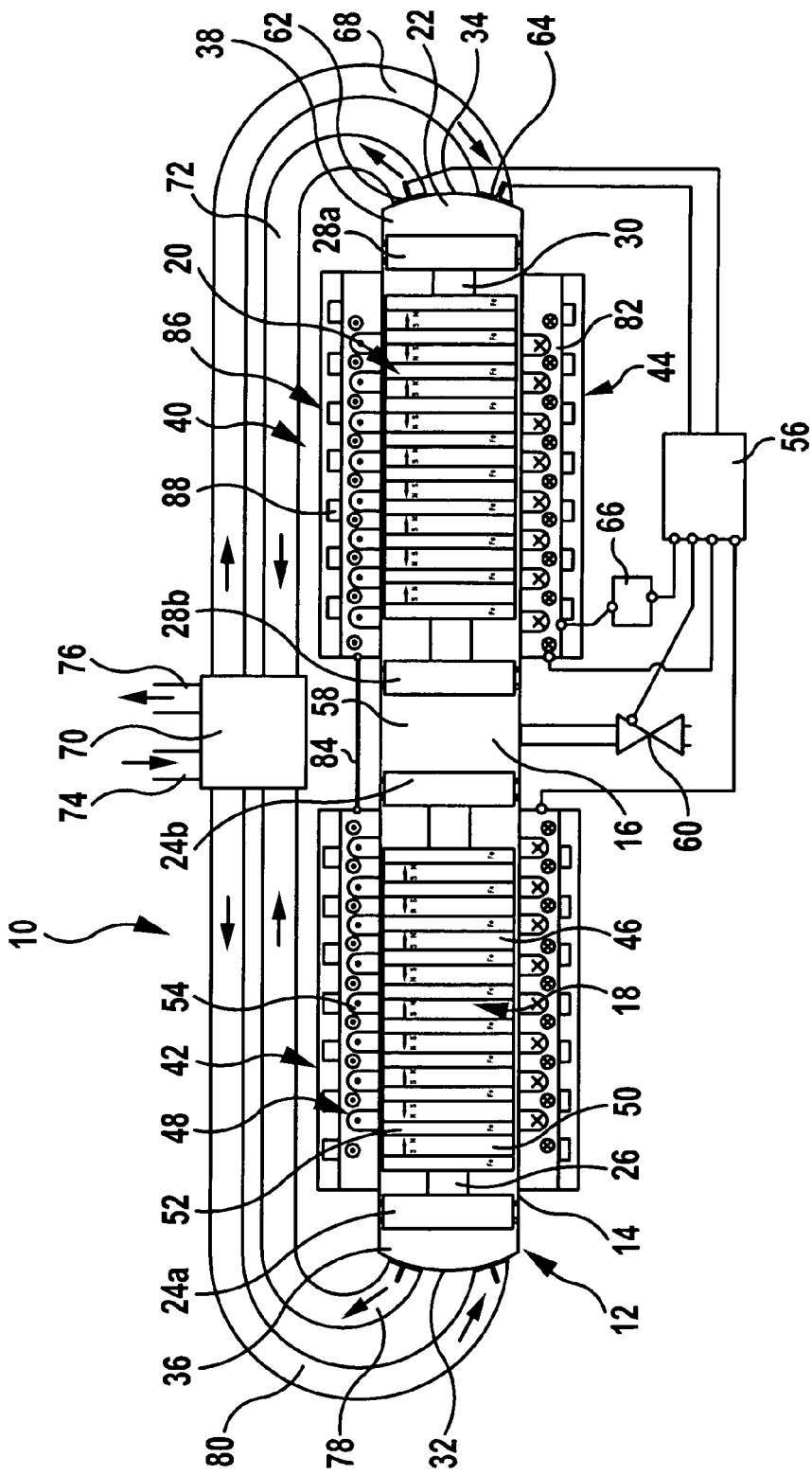
FIG. 1 is a schematic view of a first embodiment of an inventive free-piston device with an electric linear drive, which is constructed as a free-piston combustion device.

A first embodiment of an inventive free-piston device (free-piston combustion device) with an electric linear drive, which is denoted in its entirety by 10 in FIG. 1, comprises, as piston receptacle 12, a cylinder with a cylinder housing 14, in the interior 16 of which a first piston device 18 and a second piston device 20, spaced from this first piston device 18, are linearly displaceable.

At least with respect to their outer configuration, the two piston devices 18 and 20 are of substantially rotationally symmetrical design in relation to an axis of symmetry 22 of the cylinder 12. The axes of the two piston devices 18 and 20 coincide with the axis of symmetry 22.

The first piston device 18 comprises a first piston 24a and a second piston 24b arranged in spaced relation to this first piston. These two pistons, 24a and 24b, are fixedly and, in particular, rigidly connected to each other by a piston rod 26. A pair of pistons is thereby formed.

The second piston device 20 is of identical construction with a first piston 28a, a second piston 28b and a piston rod 30 arranged between these two pistons, 28a and 28b. The second piston 24b of the first piston device 18 is arranged so as to face the second piston 28b of the second piston device 20. The first piston 24a of the first piston device 18 is arranged so as to face an end wall 32 of the cylinder 12, while the first piston 28a of the second piston device 20 faces a wall 34 located opposite the end wall 32 of the cylinder 12.

A combustion chamber with combustion space 36, 38 is formed as expansion chamber between the respective first pistons 24a, 28a of the two piston devices 18, 20 and the cylinder wall 32 and 34, respectively, facing these. Combustion gases are expandable in the expansion chamber in order to drive the associated piston device (for combustion space 36 the first piston device 18 and for combustion space 38 the second piston device 20).

The dimensions of the respective combustion chambers with combustion spaces 36 and 38 are determined by the piston stroke of the respective piston devices 18 and 20, i.e., in particular, volume and surface are determined by the reversal point of the piston movement of the first pistons 24a and 28a, respectively.

The free-piston combustion device comprises an electric linear drive denoted in its entirety by 40, which comprises a first part 42 associated with the first piston device 18, and a second part 44 associated with the second piston device 20.

The corresponding part 42 and 44, respectively, of the electric linear drive 40, in turn, comprises a traveler device 46 which is arranged on the respective piston device 18 and 20, respectively. This traveler device 46 is moved with the piston device 18 and 20, respectively. Via a stator device 48 arranged on the cylinder 12 outside the cylinder housing 14 and respectively associated with the traveler device 46 of the first piston device 18 and the second piston device 20, respectively, voltages can then be induced so as to generate electric energy.

The traveler device 46 comprises magnet elements 50 and flux guiding elements 52, which are arranged alternately on the associated piston rod 26 and 30, respectively. The magnet elements 50 can be permanent magnet elements which, in particular, are formed in the shape of discs rotationally symmetrically around the axis 22. These can also be electromagnet elements which comprise corresponding coils arranged, in particular, concentrically around the axis 22. A corresponding device must then be provided for transferring energy to these electromagnets. This can take place, for example, inductively or via slip rings.

A flux guiding element 52 is also disc-shaped and is made of a material of high magnetic conductivity. For example, iron or powder composite materials that are magnetically conductive are usable.

The magnet elements 50, in particular, when these are permanent magnets, and the flux guiding elements 52 are preferably designed so as to have a central opening with which they can be pushed onto the associated piston rod 26 and 30, respectively, during manufacture of the corresponding piston device 18 and 20, respectively.

The magnet elements 50 are constructed, and, in particular, magnetized such that in a flux guiding element 52 the magnetic flux lines of the neighboring magnet elements 50 are concentrated so as to increase the power density of the system. In particular, the magnet elements 50 are arranged in parallel such that identical poles face one another.

Provision may also be made for an outer surface of the respective traveler device 46 to be constructed such that in a cross section containing the axis 22 an inner side facing a cylinder wall is of tooth-shaped design. Owing to such a tooth structure, the traveler device 46 has alternating magnetic conductivities, so that a forward drive for a piston device can thereby be generated.

The stator device 48 comprises main ring windings 54 which are arranged around an outer wall of the cylinder 12. Upon relative movement of the magnetized traveler device 46, a voltage is induced in these ring windings, whereby electric energy can be coupled out. A power generating device is then made available, which is based on the principle of free-piston guidance (linear movability of the two piston devices 18 and 20).

The stroke of the two piston devices 18 and 20 can be controlled via a control device 56. In particular, such control can be carried out such that the location of the piston devices 18, 20 is fixed at any point in time. As required, the reversal point of the piston movement of the first piston 24a and 28a, respectively, is thereby adjustable so as to be able, in turn, to set the dimensions of the respective combustion spaces 36 and 38. By a corresponding control of the linear drive 40, the piston stroke can thus be set in dependence upon the load state, the compression set, and the speed of the piston devices 18, 20 set, and the combustion space 36 and 38, respectively, thus adjusted in an optimized manner in accordance with the load state. In particular, the volume of the combustion spaces 36, 38 and the respective surfaces of these combustion spaces 36 and 38 can then also be adapted to the application. Via this setting of the piston stroke with respect to location and time (position, compression, speed), an adaptation to the fuel can also be carried out, i.e., a piston stroke length and compression can be set, depending on whether, for example, diesel or vegetable oil (Diesel principle) or gasoline, natural gas or hydrogen (Otto principle) is used as fuel. (The necessary ignition devices are not shown in the drawings).

By a specific predetermining of flows in the stator device 48 and possibly in the traveler device 46, i.e., by controlling these flows, the associated piston device 18 and 20, respectively, can thus be influenced in its linear displaceability, in order to be able to precisely fix the location of the reversal points of the piston movement of the two piston devices 18, 20 at the externally located combustion spaces 36 and 38.

Thus, for example, at full load, where a large intake amount of air is required for the combustion spaces 36 and 38, a correspondingly large piston stroke can be set, whereas for partial-load operation with reduced intake volume, a reduced stroke can be set.

The two piston devices 18 and 20 are arranged and constructed so as to work in opposite directions. There is formed between their second pistons 24b and 28b a resilience space 58 in which an elastic element or a compressible medium is accommodated.

For example, a compression spring can be arranged in the resilience space 58 to at least partially absorb the energy which was not coupled out by the linear drive 40 during a combustion cycle. This stored energy can be used for compressing the fuel-air mixture in two-cycle operation or discharging the exhaust gases in four-cycle operation.

In particular, provision may be made for a compressible fluid and, in particular, gas such as air, which absorbs the energy and releases it again, to be contained in the resilience space. Provision is made for the pressure in the resilience space 58 to be controllable via one or several valves 60. The valve or valves 60 is or are preferably controlled via the control device 56. Such a resilience space 58 in which the pressure is controllable can also be used to form a pump with respect to the two piston devices 18 and 20. Air which has been drawn in can be pumped in a controlled manner into the combustion spaces 36 and 38 by corresponding valves 100 and 102 (see FIG. 2). The resilience function (energy-storing function) can be ensured with corresponding time-controlled closure of the valves 100 and 102, i.e., uncoupling from the environment. This controlling is then carried out via the control device 56 in synchronism with the cycling of the combustion in the combustion spaces 36 and 38 (see FIG. 2 with its combustion spaces 36' and 38').

Each combustion space 36, 38 is provided with an electrically controllable outlet valve 62 and an, in particular, electrically controllable inlet valve 64, with corresponding control being carried out via the control device 56. The intake of combustion space gases and discharge of combustion products can thereby be controlled in a time-oriented manner and, in particular, controlled in a synchronized manner, for example, in conjunction with the electric activation of the linear drive 40 via a corresponding electric activation device 66 and an optional pumping function of the resilience space 58.

A suction line 68 leading into the corresponding combustion space 38 is connected to a charger 70. This suction line 68 is coupled with the combustion space 38 via an inlet valve 64. An exhaust gas line 72 leads via the outlet valve 62 to the charger 70. The charger itself has an intake line 74 for intake air and a discharge line 76 for exhaust gases.

A corresponding exhaust gas line 78 and a corresponding suction line 80 lead from the charger 70 to the other combustion space 36, and the coupling-in and coupling-out there are configured in the same way as described with reference to the other combustion space 38.

The charger 70 is, in particular, a compression wave charger (Comprex charger) in which the energy of the flow of exhaust gas from the combustion spaces 36 and 38 is used to compress the charge air (drawn-in air). With such a compression wave charger, compression waves and suction waves of the pulsating exhaust gases draw in fresh air and compress it. This compression takes place in direct contact with the exhaust gases.

A constantly oscillating displacement movement and, in particular, a collinearly opposed displacement movement of the two piston devices 18 and 20 are formable by the inventive device. In turn, a constant oscillation of the discharged exhaust gases is thereby achievable, so that the gas exchange can be controlled via a charger. The advantage of a Comprex charger is that it only has a very low intrinsic energy expenditure.

Owing to the constant period for the oscillating movement of these piston devices 18 and 20, the entire system of charger 70 and movable piston devices 18 and 20 with their respective combustion spaces 36 and 38 can be precisely configured to an optimum operating point to which, in turn, the charger 70 can be configured.

If a charger 70 is present, the above-described variant in which the resilience space 58 is used as pump is then not realized.

Furthermore, provision may be made for one or several secondary windings 82 respectively associated with the two piston devices 18, 20 to be seated around the cylinder. These are electrically separate from the main ring windings 54 of the respective stator device 48. For example, the secondary windings 82 are arranged around the main ring windings 54 or lie alongside these (in axial extension of a ring winding axis of the main ring windings 54).

Via such secondary windings 82 a further current can be coupled out, in order, for example, to supply a 12V/14V or a 36V/42V electrical system of a motor vehicle with power. The number of windings is adapted accordingly. Such secondary windings 82 are preferably followed by a rectifier so as to be able to generate a rectified current.

Via secondary windings 82 (these can be the same secondary windings as serve to couple out an additional current or secondary windings provided separately from these) a synchronization of the two piston devices 18, 20 in their linear movement in the cylinder 12 can be realized by means of a synchronizing device. At least with respect to its controlling part, the synchronizing device is constituted by the control device 56.

Depending on the position of the associated piston devices 18 and 20, a current can be generated or made to act thereupon for braking or accelerating the associated piston device 18 and 20, respectively, by specific switching-on and switching-off of the secondary windings 82. An asynchronism in the movement of the two piston devices 18, 20 can thereby be compensated by, in particular, the piston device that is running too quickly being braked. During synchronous running, these secondary windings 82 can be used to generate current.

In particular, provision may be made for the respective secondary windings 82 which face the two piston devices 18 and 20 to be electrically connected to one another. This is indicated by reference numeral 84 in FIG. 1. A compensating current which synchronizes in a self-regulating manner the movements of the two piston devices 18 and 20 can then flow between the respective secondary windings 82. The faster piston device is thereby braked and the slower one accelerated. A threshold value for this compensating current itself can, for example, be specified via the control device 56.

Provision may also be made for a cooling device 86 comprising cooling ducts 88 to be arranged around the stator device 48 in order to cool the active components of the free-piston combustion device with linear drive 10. In particular, the piston devices 18, 20, the cylinder 12 and the main ring windings 54 are among the active components. Furthermore, provision may be made for heat to be coupled out of the corresponding cooling device 86 and to be used in thermal applications, for example, for a vehicle heater or for a block-type thermal power station.

The operation of preferred embodiments of the inventive device is described below. Certain reversal points (B.D.C. and T.D.C.) of the two piston devices 18, 20 are set via the linear drive 40 by current acting correspondingly thereon, in order to specify the volume and the surface of the respective combustion spaces 36 and 38. Furthermore, the speed of the piston devices 18, 20 is fixed and, in all, the compression. This setting is carried out in dependence upon the load (partial load or full load), the fuel (gasoline, natural gas, hydrogen, diesel, vegetable oil, etc.) and any further external parameters.

Provision may be made for an electric preheating to be carried out for starting the device and for the cooling water of the cooling device 86 to also be preheated. This preheating can be carried out via the linear drive 40 by corresponding windings, for example, the main ring windings 54 being used as heating elements. Heating coils can, however, also be provided.

The pairs of pistons 24a, 24b and 28a, 28b of the two piston devices 18 and 20 provide a support for each piston device 18, 20, i.e., the pistons 24a, 24b and 28a, 28b of the pairs of pistons can be linearly guided in a substantially tilt-free manner. Moreover, the pistons 24b and 28b also serve to seal off the resilience space 58. The reversal points of the movement of the two piston devices 18, 20 can be precisely specified (with respect to location and time) by the linear drive, and, therefore, in partial-load operation, there is also no necessity for a throttle valve for the air intake, which is otherwise responsible for throttling losses.

The intake of air and the discharge of exhaust gases can be controlled in a specific manner by the valves 62 and 64 for the respective combustion spaces 36, 38. The efficiency of the entire system can thereby be improved and the quality of the exhaust gas increased. By precisely setting the control times via points in time and the duration with respect to the gas exchange (flow through valves 62, 64) an exact matching can take place between the individual time-critical procedures. Since the speed of the piston devices is also controllable, during the expansion procedure, too, the development of exhaust gases can be influenced.

Figure 4:
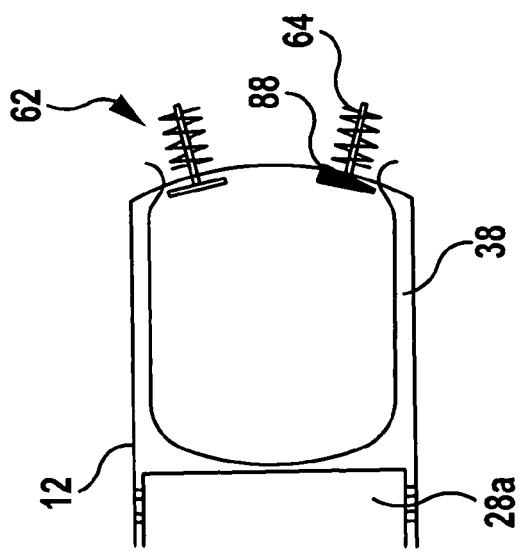
FIG. 4 is a schematic view of a combustion chamber.

In particular, the inlet valve 64 is arranged and constructed such that drawn-in air and resulting flows of gas are guided along inside cylinder walls so as to obtain an optimized flushing procedure for the gas exchange (see FIG. 4). To this end, for example, the inlet valve 64 comprises a correspondingly designed guide plate 88 which ensures such a flow along inside cylinder walls. This is required, in particular, in two-cycle operation in order to achieve a reverse flushing in the combustion space.

It is preferable for air to be drawn in and compressed and exhaust gases to be discharged via a compression wave charger 70.

During the movement of the piston devices 18, 20, on account of the relative movement between the traveler device 46 and the stator device 48 a voltage is induced in the latter, so that electric energy is generated (i.e. mechanical energy is partly converted into electric energy, and, in turn, the mechanical energy originates from a partial conversion into chemical energy on account of the combustion). Energy which is not coupled out by the linear drive 40 during the combustion cycle can be taken up by the resilience space 58.

The stator device 48 is cooled via the cooling device 86. The cooling device 86 also cools further parts of the cylinder 12 and, for example, the piston devices 18 and 20.

The pistons 24a, 24b, 28a, 28b are, for example, lubricated by a simple splash lubrication, i.e., an oil pump is not required. The pistons then move in an oil bath which is whirled around by the movement so as to ensure adequate provision with lubricating oil.

The pistons 24a, 24b, 28a, 28b can be manufactured with a minimized side face facing the cylinder 12, i.e., the piston skirts can be of short configuration as pairs of pistons with mutual supporting action are provided. Frictional losses during the movement of the two piston devices 18 and 20 can thereby be minimized.

In turn, the pistons 24a, 24b, 28a, 28b can then be made of non-metallic materials such as ceramic materials or graphite or, for example, glass carbon. Such pistons can do without lubrication. This configuration is possible because essentially no transverse forces occur due to the mutual supporting of the pairs of pistons.

Owing to the inventive traveler device 46 with alternatingly arranged magnet elements 50 and flux guiding elements 52, a high power density of the system is achievable without magnets with high retentivity having to be used. In particular, high power densities are achievable when the pole pitch in the traveler device and the stator device is different.

The linear drive 40 itself can be of one-phase, two-phase, three-phase or multi-phase construction.

The main ring windings 54 of the corresponding stator device 48 can, for example, be embedded in iron packets so as to achieve a field guidance.

The two piston devices 18, 20 movable in opposite directions can be synchronized with each other by the synchronizing device, and, in particular, a self-regulation can be carried out via a compensating current.

Furthermore, provision may be made for the control device 56 to evaluate position information regarding the two piston devices 18, 20 via the induced voltage. This evaluation is an evaluation of the position of the traveler device 46 relative to the associated stator device 48. For example, these detection results can then be used to improve the synchronization of the two piston devices 18 and 20. By providing additional windings for the stator device 48, the accuracy of the determination of the position can be increased.

The inventive free-piston combustion device can, for example, be operated in two-cycle operation or four-cycle operation.

Figure 2:
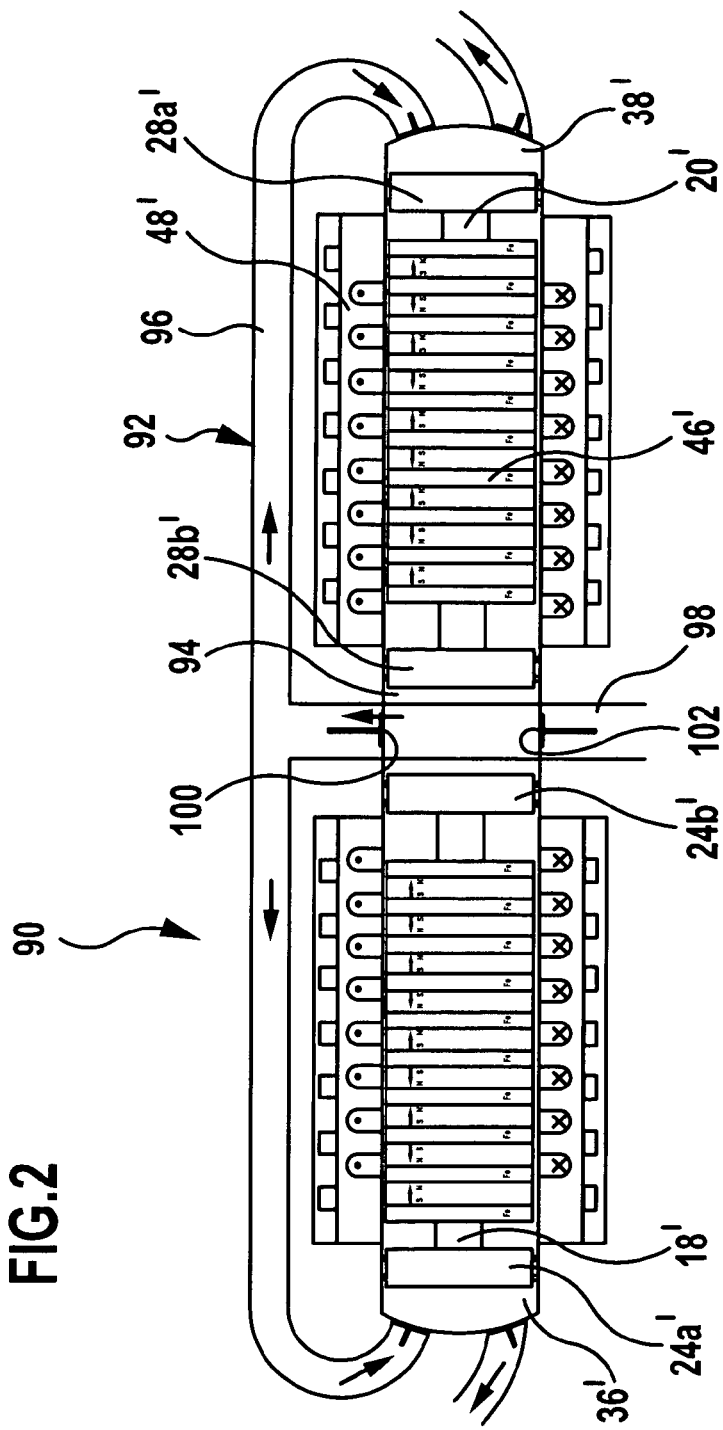
FIG. 2 is a schematic view of a second embodiment of an inventive device.

In a second embodiment denoted in its entirety by 90 in FIG. 2, an overflow guide 92 is provided instead of a charger 70. The cylinder 12 itself is basically of the same construction as described hereinabove, so that like parts are denoted by the same reference numeral as in FIG. 1, but with the addition of a prime.

A corresponding resilience space 94 is coupled to a suction channel 96 and a suction channel 98 via corresponding valves 100 and 102, so that air can be drawn into the corresponding combustion spaces 36' and 38' via this. The volume of the resilience space 94 is larger than the total volume of the two combustion spaces 36', 38' together so as to achieve a pre-compression of the intake air. Otherwise, the device 90 operates in exactly the same way as described hereinabove. In the resilience space 94, which has a pumping function, drawn-in air can be pre-compressed before it is pumped into the combustion spaces 36' and 38'.

Figure 3:
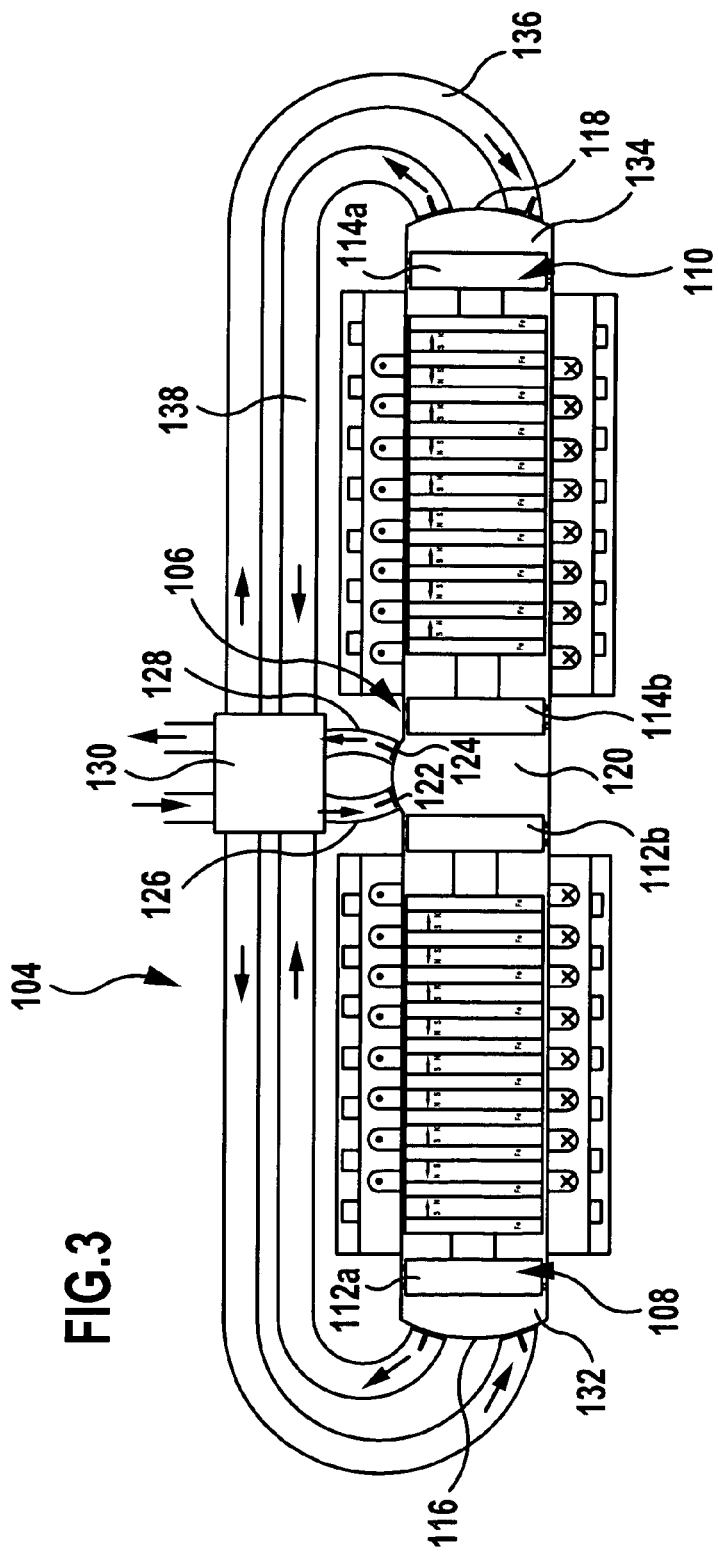
FIG. 3 is a schematic view of a third embodiment of an inventive device.

In a third embodiment denoted in its entirety by 104 in FIG. 3, a cylinder 106 is again provided, in which two piston devices 108 and 110 are again guided for linear displacement. These are constructed, as described hereinabove, with respective pairs of pistons 112a, 112b and 114a, 114b. The pistons 112a and 114a are arranged so as to each face a respective cylinder wall 116 and 118 at the end face, while the two pistons 112b and 114b face each other.

Differently from the embodiments 10 and 90, the intermediate space between the two piston devices 108 and 110 is constructed as a combustion space 120 in which an air-fuel mixture is ignitable.

To this end, this combustion space 120 is provided with an inlet valve 122 and an outlet valve 124. Fresh air is introduced into the combustion space 120 via the inlet valve 122 and exhaust gas is discharged via the outlet valve 124.

A corresponding suction line 126 and a discharge line 128 are connected to a charger 130 which, in turn, as described hereinabove with reference to the first embodiment, is connected via respective suction lines 136 and exhaust gas discharge lines 138 to the outer combustion spaces 132 and 134. Otherwise, the free-piston combustion device with linear generator operates as described hereinabove.

Figure 5:
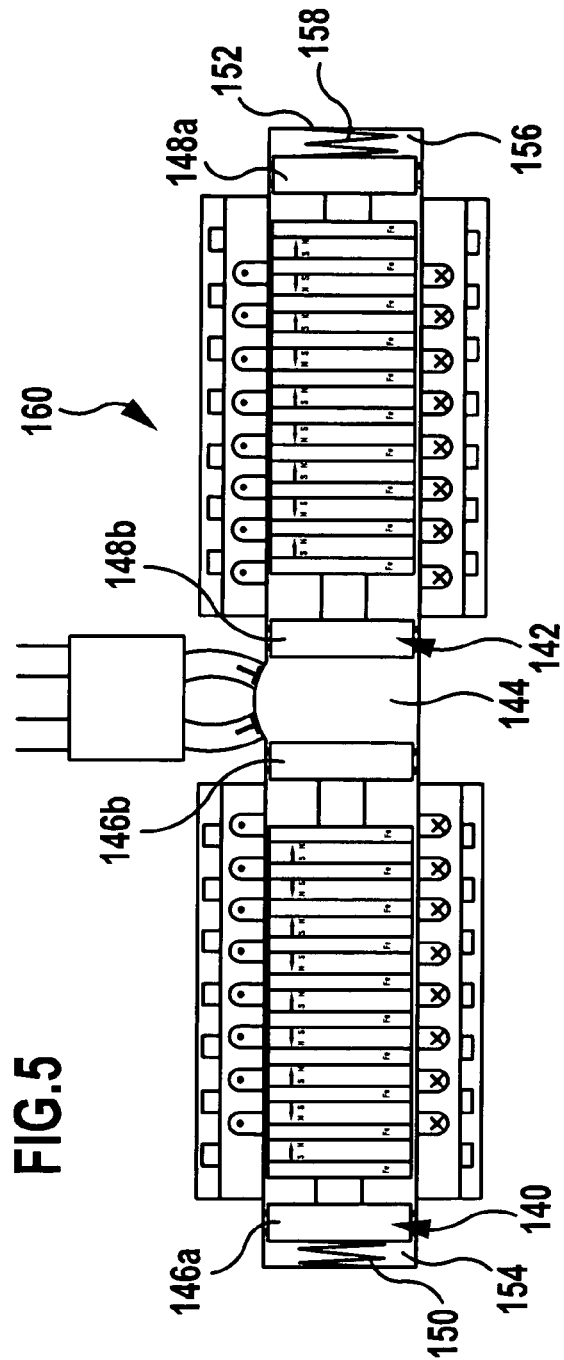
FIG. 5 is a schematic view of a fourth embodiment of an inventive device.

It is, in principle, possible for piston devices 140, 142 with a combustion space 144 arranged therebetween to be provided (FIG. 5). Each piston device 140, 142, in turn, comprises a pair of spaced pistons 146a, 146b and 148a, 148b, respectively. Provision is made for a resilience space 154, 156 to be formed between the piston 146a and a cylinder wall 150 facing it and between the piston 148a and the cylinder wall 152 facing it. Arranged in each resilience space 154, 156 is, for example, an elastic element 158, preferably a compression spring.

With such a device, the energy not absorbed by a corresponding linear drive 160 during a combustion cycle (combustion in the combustion space 144) can then be temporarily stored for each piston device 140, 142 separately, i.e., in a respectively associated resilience space 154 and 156, respectively. The linear drive 160 is, in principle, constructed in the same way as described hereinabove with reference to the linear drive 40.

Figure 6:
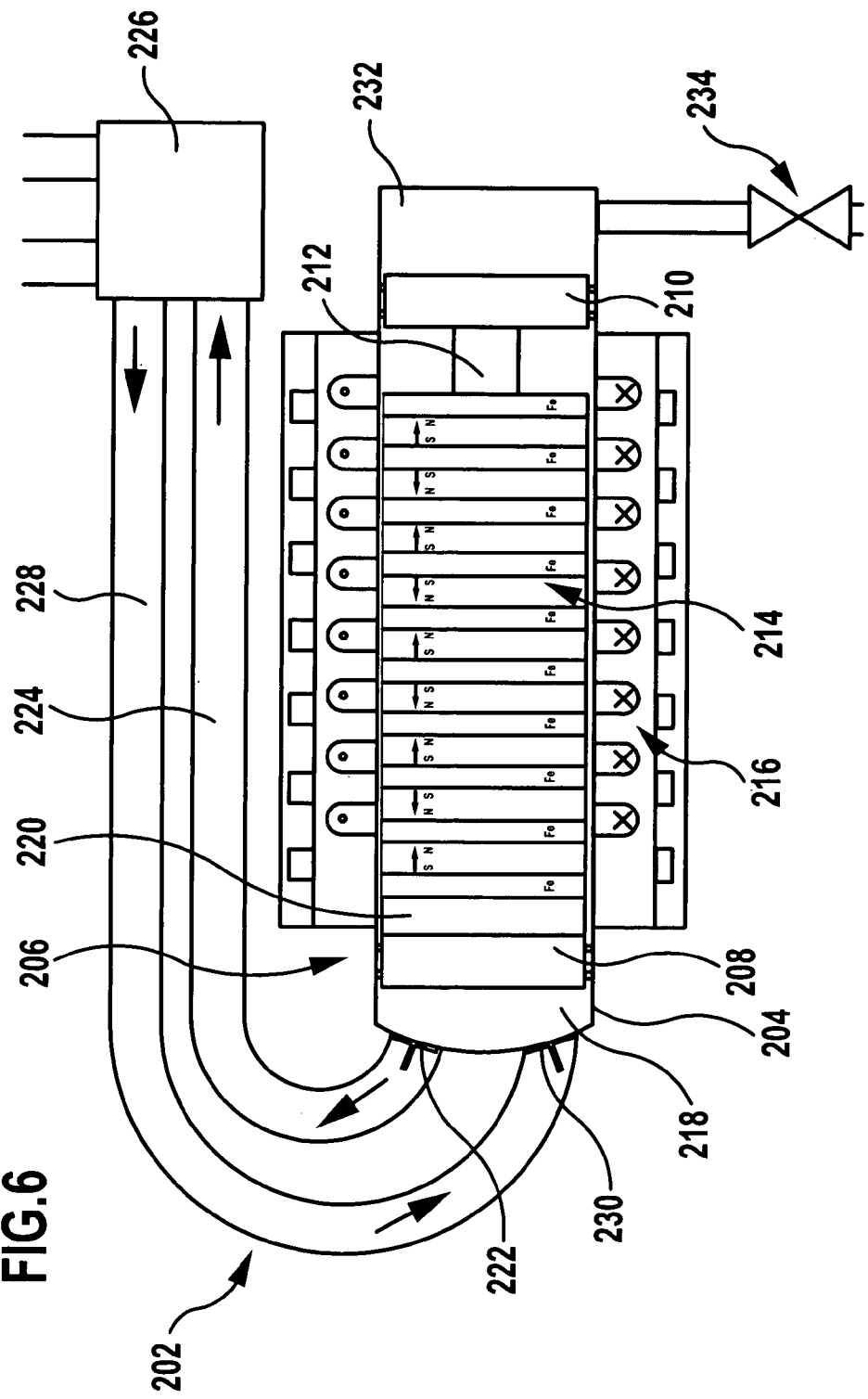
FIG. 6 is a schematic view of a fifth embodiment of an inventive device.

In a fifth embodiment of an inventive free-piston combustion device with linear drive denoted in its entirety by 202 in FIG. 6, a piston receptacle 204 is provided, in which a single piston device 206 is linearly displaceable. Several such piston receptacles 204 can, for example, be interconnected to generate current by, for example, being stacked in packets or by two piston receptacles being respectively arranged in the shape of a V.

The piston device 206 again comprises a first piston 208 and an opposite second piston 210 which essentially serves to support the first piston 208. Arranged between these two pistons 208 and 210 is a piston rod 212 which joins these two pistons 208 and 210 to each other.

A traveler device 214 which is constructed as described hereinabove is arranged between these two pistons 208 and 210 on the piston rod 212. Seated, in turn, on the piston receptacle 204 is a stator device 216 which is constructed as described hereinabove.

The first piston 208 faces an expansion space constructed as combustion space 218 and delimits this. This first piston 208 thus also directly experiences the pressure of the combustion gases expanding in the combustion space 218, which drive the piston device 206.

Provision is preferably made for a thermal insulating element 220, for example, a ceramic disc of the traveler device 214 to be arranged on the first piston 208 to thermally insulate the combustion space 218 from the traveler device 214.

An exhaust gas line 224 leads from the combustion space 218 via a controllable outlet valve 222 to a charger 226. Furthermore, an intake line 228 leads from this charger 226 to the combustion space 218, into which it opens via a controllable inlet valve 230. The charger 226 with its coupling to the combustion space 218 operates as described hereinabove.

The second piston 210 faces a space 232 which is a non-combustion space. In particular, this is constructed as a resilience space in which a mechanical elastic element (not shown in FIG. 6) is arranged or in which a compressible medium such as air is contained. In this case, controllable valves 234 for controlling the pressure in this space 232 are provided so as to be able to control the resilience. The inventive device 202 operates as described hereinabove with reference to the first embodiment, i.e., the piston movement is variably settable via the control device 56.

The top reversal point (T.D.C.) and the bottom reversal point (B.D.C.) are settable, in particular, spatially with respect to the piston receptacle 204, and with respect to time. Furthermore, the piston speed is settable and, therefore, in turn, the compression in the combustion space 218 is settable. In particular, setting is done via a linear drive which comprises the traveler device 214 and the stator device 216. Owing to an adjustability of the piston movement such that the position of the first piston 208 is settable at least with respect to the point in time for reaching the top reversal point and the bottom reversal point, and, preferably, such that the piston position of the first piston 208 is fixable in a defined manner at any point in time, the device can be adapted in a variable manner to different operating conditions or different operating parameters.

Free-piston combustion devices have been described hereinabove as embodiments of inventive free-piston devices. In particular, these can be used as internal combustion engines. It is also possible to realize a free-piston steam engine by way of the inventive solution, as will be described in further detail hereinbelow.

Figure 7:
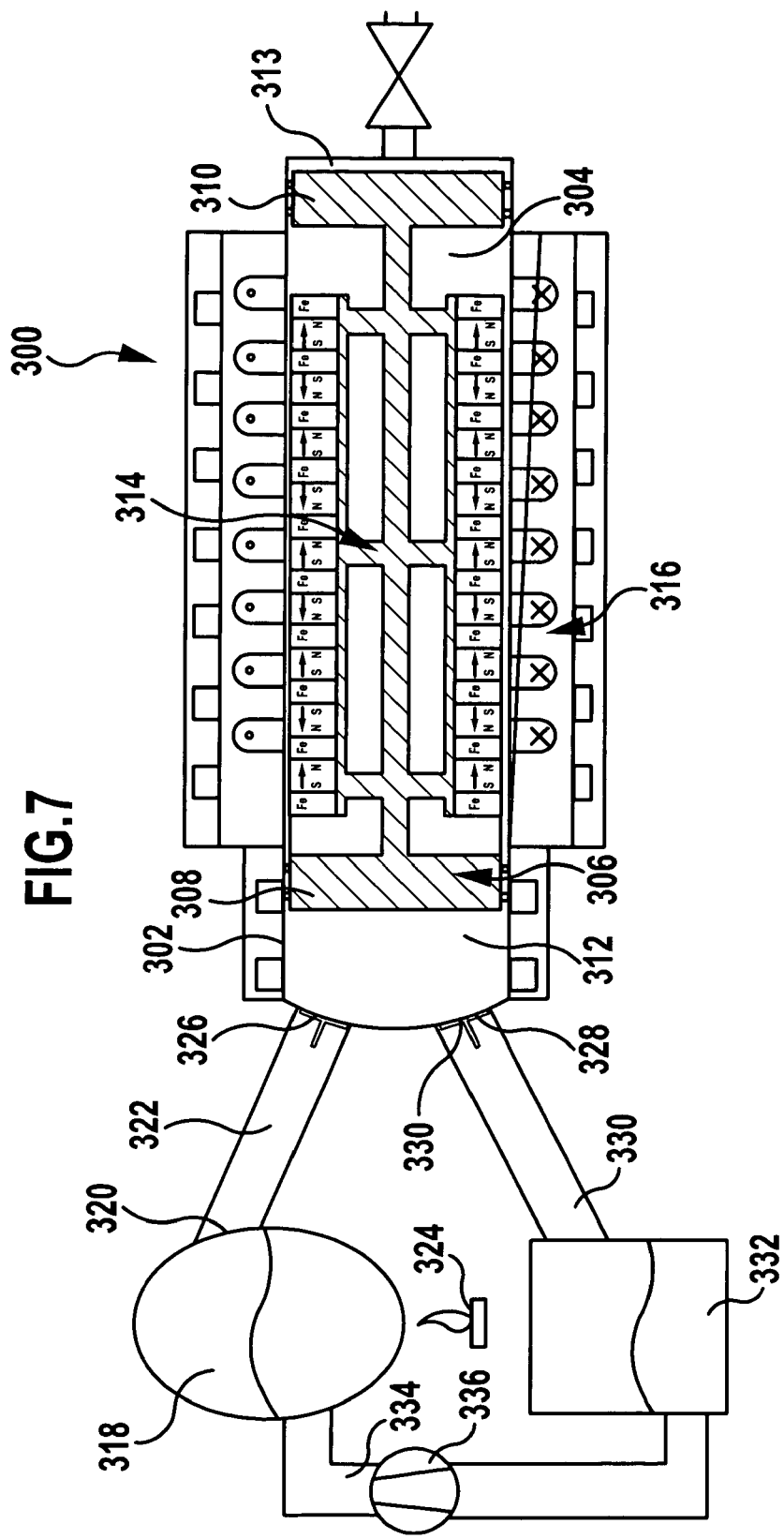
FIG. 7 is a schematic view of a sixth embodiment of an inventive device, which is constructed as a free-piston steam engine.

In a sixth embodiment of an inventive free-piston device denoted in its entirety by 300 in FIG. 7, a piston receptacle 302 comprises an interior 304 in which a piston device 306 is arranged so as to be linearly movable. The piston device 306 comprises a first piston 308 and an opposite second piston 310 connected thereto.

The first piston 308 delimits an expansion space 312 in which a heat transfer medium such as steam can expand, and via this expansion of the heat transfer medium a force is exerted on the first piston 308 and thus on the piston device 306. The second piston 310 delimits a resilience space 313 which is formed in the interior 304 of the piston receptacle 302 at the other end with respect to the expansion space 312.

A traveler device 314 which moves with the piston device 306 is fixed on the piston device 306. A stator device 316 is stationarily fixed with respect to the piston receptacle 302. The mode of operation of such a drive device is, in principle, the same as described hereinabove.

The heat transfer medium which, in particular, is steam, is produced or heated outside the expansion space 312. To this end, a pressure vessel 318 is, for example, provided, which is coupled via an outlet 320 to the expansion space 312. A line 322 for heat transfer medium is arranged between this outlet 320 and the expansion space 312.

The pressure vessel 318 is heatable by means of a heat source 324. The heat source itself can be heated by means of solar radiation or by means of fuels.

Heated heat transfer medium such as, for example, hot steam is coupled from the pressure vessel 318 into the expansion space 312 and can expand therein. This results in a piston movement at the piston device 306, whereby electric energy can be generated. For coupling the heat transfer medium into the expansion space there is arranged thereat a corresponding valve 326 which is mechanically or electrically actuatable. The heat transfer medium intake can thereby be controlled in a corresponding manner.

A further valve 330 via which the medium discharge from the expansion space 312 is controllable is seated at an outlet 328 of the expansion space 312, and, in particular, this control is coupled with the heat transfer medium intake.

The outlet 328 is connected via a line 330 to a recooling device 332 via which medium discharged from the expansion space 312 can be cooled. The medium entering the recooling device 332 is at a lower pressure than the medium exiting from the pressure vessel 318 and entering the expansion space 312 for expansion. Medium such as steam can be guided from the recooling device 332 via a line 334 into the pressure vessel 318 in order to supply energy to the medium therein, i.e., in order to make heat transfer medium available for the expansion space 312.

A pump 336 for conveying the medium into the pressure vessel 318 is arranged in the line 334. The pressure vessel 318 is preferably filled with steam.

By expansion of the steam introduced under pressure into the expansion space 312 the linear movement of the piston device 306 is brought about, which, in turn, causes electric energy to be generated. The piston movement and the generation of the electric energy are brought about in basically the same way as described hereinabove.

A plurality of piston devices and expansion spaces as described hereinabove may also be provided in such a free-piston steam engine. With a free-piston combustion device, it is also possible to introduce combustion gases into a combustion space, wherein the combustion gases have been generated externally and are then coupled into the combustion space which is delimited by the corresponding piston device.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Free-piston device with electric linear drive, comprising:
    at least one piston receptacle;
    at least one piston device arranged for linear displacement in the piston receptacle,
    wherein the piston device delimits an expansion space at a first end and a non-expansion space at an opposite end;
    wherein said piston device comprises a traveler device;
    wherein a stator device is arranged on said piston receptacle;
    wherein said at least one piston device is drivable under the action of a medium which expands in the expansion space; and
    wherein the piston stroke is variably adjustable via the linear drive such that the dead centers of the displacement of the piston device are definable.

2. Free-piston device in accordance with claim 1, wherein the dead centers are spatially definable with respect to the piston receptacle.

3. Free-piston device in accordance with claim 1, wherein the dead centers for the displacement of the piston device are definable with respect to time.

4. Free-piston device in accordance with claim 1, wherein the displacement of the piston device is variably adjustable such that the location of the piston device is definable at any point in time.

5. Free-piston device in accordance with claim 1, wherein at least one of top dead center and bottom dead center of the piston stroke of the piston device are definable.

6. Free-piston device in accordance with claim 1, wherein the compression in the expansion space is adjustable via the linear drive.

7. Free-piston device in accordance with claim 1, wherein the expansion space is variably adjustable.

8. Free-piston device in accordance with claim 1, wherein volume and surface of the expansion space are adjustable.

9. Free-piston device in accordance with claim 1, wherein a control device is provided for electrically activating the linear drive such that a variable piston stroke is settable.

10. Free-piston device in accordance with claim 1, wherein the piston device comprises a first piston and a second opposite piston fixedly connected to said first piston.

11. Free-piston device in accordance with claim 10, wherein the traveler device is arranged between the first piston and the second piston.

12. Free-piston device in accordance with claim 1, wherein the non-expansion space delimited by the piston device is formed as a resilience space for the piston device.

13. Free-piston device in accordance with claim 12, wherein the resilience space is provided with at least one controllable inlet valve and at least one controllable outlet valve for the compressible medium.

14. Free-piston device in accordance with claim 12, wherein at least one of a compressible element and medium is accommodated in the resilience space.

15. Free-piston device in accordance with claim 14, wherein the compressible element is a mechanically elastic element.

16. Free-piston device in accordance with claim 14, wherein the compressible medium is a compressible fluid.

17. Free-piston device in accordance with claim 14, wherein the pressure in the resilience space is at least one of adjustable and controllable.

18. Free-piston device in accordance with claim 17, wherein the pressure in the resilience space is controllable such that at least one of a pumping function and compression function and suction function is achievable.

19. Free-piston device in accordance with, claim 17, wherein the pressure in the resilience space is controllable such that a pumping effect with respect to a piston device is achievable.

20. Free-piston device in accordance with claim 1, comprising a first piston device and a second piston device, which are arranged for linear displacement, said piston devices each comprising a traveler device, and a stator device associated with the respective traveler device being arranged on the piston receptacle.

21. Free-piston device in accordance with claim 20, wherein each of the two piston devices has an expansion space of its own associated therewith.

22. Free-piston device in accordance with claim 21, wherein the expansion space is formed between a piston of the respective piston device, which faces away from the other piston device, and a piston accommodating wall which faces said piston.

23. Free-piston device in accordance with claim 20, wherein the two piston devices are displaceable in opposite directions to each other.

24. Free-piston device in accordance with claim 20, wherein a further expansion space is arranged between the two piston devices.

25. Free-piston device in accordance with claim 20, wherein at least one resilience space is arranged between the two piston devices.

26. Free-piston device in accordance with claim 1, wherein the valve or valves for the gas exchange in an expansion space is or are controllable via a control device.

27. Free-piston device in accordance with claim 26, wherein the valve or valves for the gas exchange in an expansion space is or are electrically controllable.

28. Free-piston device in accordance with claim 1, wherein at least one of inlet valves mid outlet valves for an expansion space are arranged and constructed such that a flow of gas is formable substantially along an expansion chamber wall.

29. Free-piston device in accordance with claim 1, wherein at least one charger is provided for controlling the exchange of gas in an expansion space or the expansion spaces.

30. Free-piston device in accordance with claim 29, wherein the charger is a compression wave charger.

31. Free-piston device in accordance with claim 29, wherein the charger is connected to one or more expansion spaces for the respective piston devices.

32. Free-piston device in accordance with claim 1, wherein a piston device is lubricated by splash lubrication.

33. Free-piston device in accordance with claim 1, wherein a heating device is provided for pre-heating.

34. Free-piston device in accordance with claim 33, wherein windings of the stator device are used as heating elements.

35. Free-piston device in accordance with claim 1, wherein the traveler device comprises a plurality of magnet elements having one or several flux guiding elements associated therewith.

36. Free-piston device in accordance with claim 35, wherein the magnet elements and the flux guiding elements are seated on a piston rod.

37. Free-piston device in accordance with claim 36, wherein the magnet elements and the flux guiding elements are formed rotationally symmetrically with respect to an axis of the piston rod.

38. Free-piston device in accordance with claim 35, wherein the magnet elements and flux guiding elements are arranged alternately.

39. Free-piston device in accordance with claim 35, wherein the flux guiding elements are made of a magnetically conductive material.

40. Free-piston device in accordance with claim 35, wherein a flux guiding element is constructed such that magnetic flux lines or the neighboring magnet elements are concentratable therein.

41. Free-piston device in accordance with claim 35, wherein the magnet elements are permanent magnet elements.

42. Free-piston device in accordance with claim 35, wherein the magnet elements are electromagnet elements.

43. Free-piston device in accordance with claim 1, wherein a stator device comprises main ring windings which run around the piston receptacle.

44. Free-piston device in accordance with claim 43, wherein additional secondary windings are provided for coupling out electric energy.

45. Free-piston device in accordance with claim 44, wherein the secondary windings are followed by a rectifier.

46. Free-piston device in accordance with claim 20, wherein a synchronizing device is provided for synchronizing the displacement of the two piston devices.

47. Free-piston device in accordance with claim 46, wherein the synchronizing device comprises secondary windings on the piston receptacle, with the current flowing through these being individually controllable.

48. Free-piston device in accordance with claim 46, wherein the synchronizing device comprises secondary windings on the piston receptacle, which are associated with the respective piston devices and are electrically connected to one another, so that a compensating current can flow between the secondary windings.

49. Free-piston device in accordance with claim 48, wherein the flow of current is electrically controllable.

50. Free-piston device in accordance with claim 1, wherein the position of the piston device in the piston receptacle is detected from an induced voltage via a control device.

51. Free-piston device in accordance with claim 1, wherein a lubricator for the piston device is constructed such that the associated traveler device is coolable with the lubricating oil.

52. Free-piston device in accordance with claim 1, wherein cooling ducts are arranged around the stator device.

53. Free-piston device in accordance with claim 1, wherein cooling ducts are arranged around the piston receptacle.

54. Free-piston device in accordance with claim 1, wherein the traveler device and the stator device have different pole pitches.

55. Free-piston device in accordance with claim 1, wherein an expansion space is constructed as combustion space.

56. Free-piston device in accordance with claim 55, wherein combustion gases expand in a combustion space.

57. Free-piston device in accordance with claim 56, wherein combustion gases are generated in the combustion space.

58. Free-piston device in accordance with claim 56, wherein combustion gases are generated externally and coupled into the combustion space.

59. Free-piston device in accordance with claim 1, wherein a heat transfer medium expands in an expansion space.

60. Free-piston device in accordance with claim 59, wherein the heat transfer medium is steam.

61. Free-piston device in accordance with claim 59, wherein the heat transfer medium is generated outside the expansion space or energy is supplied to the heat transfer medium outside the expansion space.

62. Free-piston device in accordance with claim 59, wherein a recooling device is provided for medium discharged from the expansion space.

63. A method for adjusting the piston stroke of a free-piston device
with an electric linear drive, comprising:
providing a free-piston device comprising at least one piston receptacle, at least one piston device arranged for linear displacement in the piston receptacle, wherein the piston device delimits an expansion space at a first end and a non-expansion space at an opposite end, a traveler device, and a stator device arranged on the piston receptacle, wherein the piston device is drivable under the action of a medium which expands in the expansion space; and
variably adjusting the piston stroke via the linear drive such that the dead centers of the displacement of the piston device are defined.

* * * * *

UNITED STATES PATENT AND TRADEMARK OFFICE
CERTIFICATE OF CORRECTION

PATENT NO. : 7,082,909 B2
APPLICATION NO. :10/972110
DATED : August 1, 2006
INVENTOR(S) : Gräf et al.

It is certified that error appears in the above-identified patent and that said Letters Patent is hereby corrected as shown below:

Column 18,
Line 50, "mid" should read --and--.

Column 19,
Line 23, "or" should read --of--.

Signed and Sealed this

Twenty-sixth Day of December, 2006

JON W. DUDAS
*Director of the United States Patent and Trademark Office*